R. H. EASTBURN.
BROOM.
No. 170,071. Patented Nov. 16, 1875.
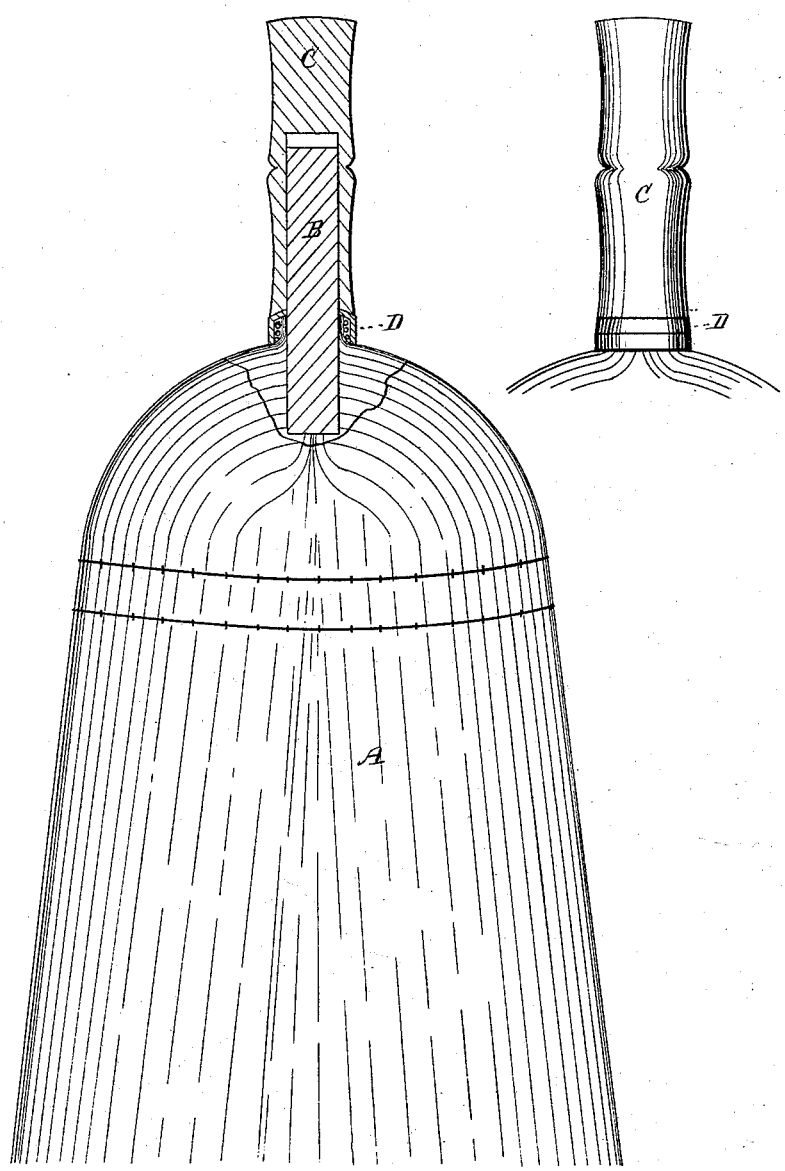
Witnesses
Albert E. Zacherle,
Wm. R. Wiley
Inventor
Robert H. Eastburn
per George E. Buckley
his atty.

UNITED STATES PATENT OFFICE.

ROBERT H. EASTBURN, OF PHILADELPHIA, PENNSYLVANIA.

IMPROVEMENT IN BROOMS.

Specification forming part of Letters Patent No. 170,071, dated November 16, 1875; application filed October 7, 1875.

*To all whom it may concern:*

Be it known that I, ROBERT H. EASTBURN, of Philadelphia, Pennsylvania, have invented a new and useful Improvement in Whisks, Dusters, Brooms, &c.; and I do hereby declare the following to be a full, clear, and exact description of the same, reference being had to the accompanying drawing, making part hereof.

My invention consists of the combination, in a whisk, duster, or broom, of a recessed handle, a binding-stick fitting into said recessed handle, and a separate ferrule, which is held down by a shoulder on the handle, said ferrule being located between the handle and the body of the whisk, duster, or broom.

To enable others skilled in the art to make and use my invention, I will more particularly describe its construction.

The drawing shows an elevation of a duster, with a portion broken out to display more fully the arrangement of the handle and ferrule.

A is the body of the whisk, duster, or broom; B, the base or binding stick upon which the whisk is bound; C, the recessed handle which receives the stick B; D, the ferrule, which fits over and conceals the binding, and is placed between the handle and the body of the whisk. The stick B and the recess of handle C are made nearly of one size, so as to fit tightly. Ferrule D is made of brass, copper, tin, bone, horn, or other suitable material.

The broom, whisk, or duster A is first made and secured in the ordinary way upon the base-stick B by means of binding, the stick being long enough to project above the said binding. The ferrule D, made of brass, horn, silver, tin, or other suitable material, is then slipped on over the base-stick, and is of such diameter or size as to surround or cover the binding of the broom, and rest upon the top of said body, or nearly so. The projecting end of base-stick B is then covered with glue, and the handle C, which has previously been recessed to receive said stick B, is then placed over the latter, and fitted down tightly upon the top of the ferrule D. After the glue is dry the whisk or duster is ready for use.

The edge of ferrule D should not rest upon the top of the whisk, as it may cut the broom-sprays of which it is composed, but should barely come near the lower edge of the binding.

The ferrule D, being separate from the rest of the handle, is capable of high ornamentation, and, by being of different material from the handle C, may be made to add to the beauty of the whisk by producing fine contrast to said handle. It can be made very cheaply of metal, and, being made of metal, is not so subject to fracture as if the wooden handle C were carried down over the binding by being recessed out to project down that far.

I am well aware of the patent granted to J. L. Stranahan of April 15, 1873, for broom-corn dusters, and do not claim the device therein shown.

Having thus described my invention, what I claim as new, and desire to secure by Letters Patent, is—

In a whisk, duster, or broom, the combination of a recessed handle, a binding-stick fitting into said recessed handle, and a separate ferrule between the handle and the body of the whisk, duster, or broom, substantially as described.

ROBERT H. EASTBURN.

Witnesses:
 CHAS. H. ROBENO,
 ALBERT E. ZACHERLE.